Feb. 13, 1945.  F. L. STREUBER  2,369,498
APPARATUS FOR CLEANING ROLLER BEARINGS
Filed April 17, 1942  2 Sheets-Sheet 1

INVENTOR.
Fred L. Streuber
BY
Emery, Varney, Whittemore & Dix
ATTORNEYS

Feb. 13, 1945.   F. L. STREUBER   2,369,498
APPARATUS FOR CLEANING ROLLER BEARINGS
Filed April 17, 1942   2 Sheets-Sheet 2
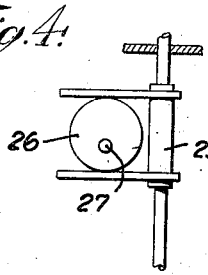
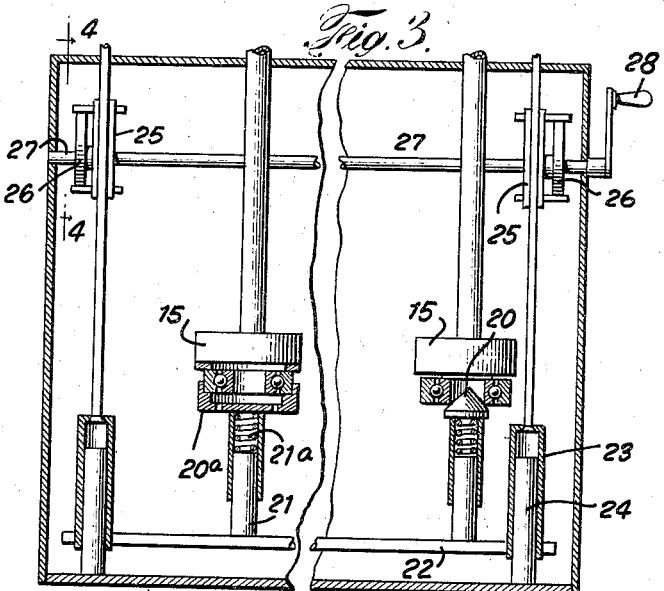
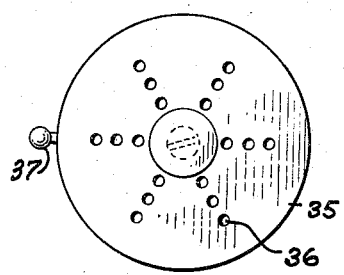
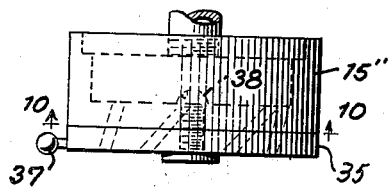
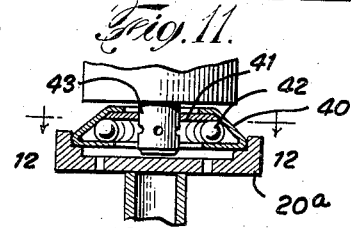
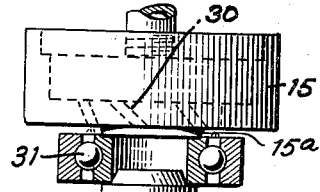
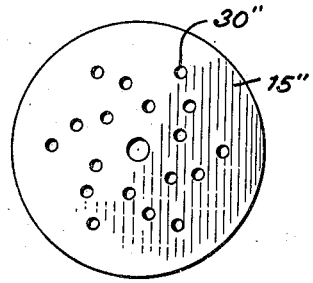
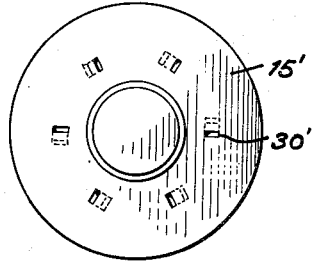
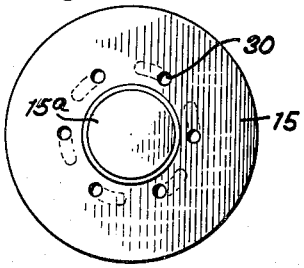
INVENTOR.
Fred L. Streuber
BY
Emery, Varney, Whittemore & Dix
ATTORNEYS Patented Feb. 13, 1945

2,369,498

UNITED STATES PATENT OFFICE 2,369,498

APPARATUS FOR CLEANING ROLLER BEARINGS

Fred L. Streuber, Astoria, N. Y.

Application April 17, 1942, Serial No. 439,332

6 Claims. (Cl. 141—1)

This invention relates to apparatus for cleaning roller bearings and has for an object the provision of improvements in this art.

The term "roller bearings" is used in its broad sense to include all anti-friction bearings which employ interposed rollers, whether the rollers are of the ball type or the commonly designated "roller" type, meaning cylindrical or conical rollers, or any other type.

According to this invention, the bearing assembly is supported by one race leaving the rollers and the other race free for movement effected by the cleaning fluid, whereby a very high degree of cleaning efficiency is achieved. The cleansing fluid is forced under high pressure in jets from a cleaning head to the center of the bearing rollers and issues at a forward angle to cause relative rotation between parts in the bearing assembly while cleaning it. The fluid may be filtered and recirculated to the bearings.

Means are provided for accurately and quickly positioning one or more bearing assemblies in proper relationship to a cleaning head, and means are also provided for quickly modifying the head for cleaning bearings of different sizes and types.

In order to furnish a ready understanding of the principles and manner of applying the invention, certain exemplary embodiments thereof will now be described in detail, reference being made to the accompanying drawings, wherein:

Fig. 3 is an enlarged vertical section taken on the line 3—3 of Fig. 1;

Fig. 4 is a partial section taken on the line 4—4 of Fig. 3;

Fig. 5 is an enlarged side view of one of the cleaning heads shown in Fig. 2;

Fig. 6 is a bottom plan view of Fig. 5;

Fig. 7 is a similar plan view of a modification;

Fig. 8 is a side view of an adjustable cleaning head;

Fig. 9 is a bottom plan view of Fig. 8;

Fig. 10 is an intermediate plan view on the line 10—10 of Fig. 8;

Fig. 11 is a side view of a modification; and

Fig. 12 is a partial section on the line 12—12 of Fig. 11.

Figure 1:
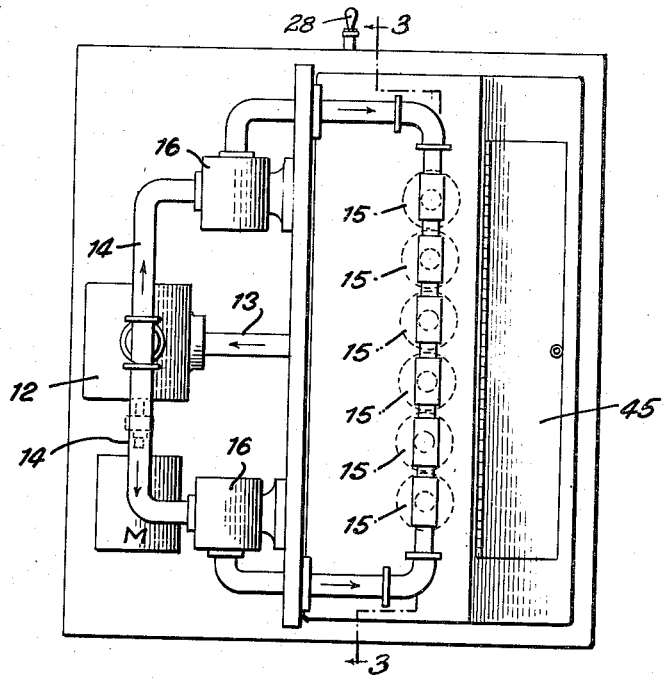
Fig. 1 is a top plan view of apparatus adapted to clean a number of bearing assemblies at one time.
Figure 2:
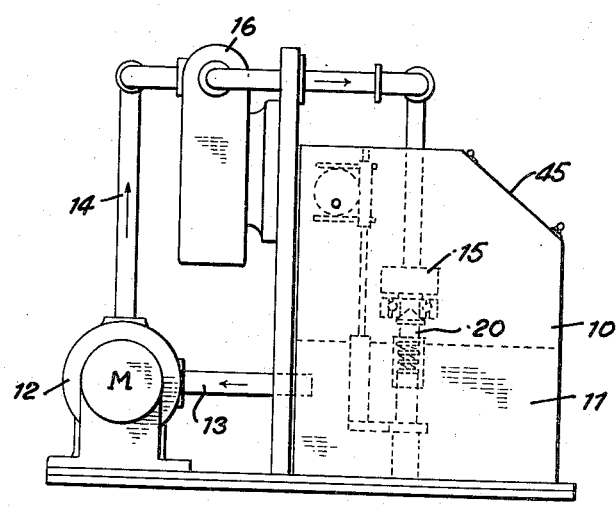
Fig. 2 is a side elevation of the apparatus shown in Fig. 1.

Referring to the drawings, the apparatus comprises a vessel 10 adapted to house the cleaning mechanism and receive the used fluid in a sump portion 11. A pump 12 withdraws the cleaning fluid from the sump by a suction pipe 13 and forces it under pressure through one or more pipes 14 to one or more cleaning heads 15. The heads have parts or elements 15a engaging one of the bearing races. One or more filters 16 may be provided in the fluid circuit, preferably in the pressure line, as shown, and here one may be placed in each of the branch pipes 14. The purpose of providing branch pipes is to avoid excessive drop in pressure from one head to the next, and, if desired, there may be one branch for each head.

Each bearing assembly is mounted on a lower head which includes a support 20 or 20a, the preferred form 20 being conical or shouldered and adapted to engage the inner race and the other 20a being recessed and adapted to engage the outer race. A few types are shown to indicate interchangeability of bearing supports on the related parts. The race supports have sockets to fit vertical stud pins 21 and may be readily placed thereon or removed therefrom. Springs 21a are provided between supports and studs to accommodate races of different thicknesses.

Means are provided for bringing the bearings toward the cleaning heads 15 so that the supported race is held thereagainst during the cleaning operation and for separating them after cleaning to permit removal and replacement. The means herein provided for this purpose comprises a bar 22 on which the stud pins 21 are secured, the bar being attached at its ends to tubular slides 23 movable on fixed guide pins 24. The slides are attached to slotted yokes 25 which embrace eccentrics 26 carried on a cross shaft 27. By turning the shaft to upper or lower dead center by the handle 28 the bearing supports may be moved to upper or lower position.

The cleaning heads are provided with one or more inclined openings 30 adapted to direct cleaning fluid upon and between the bearing rollers 31 and between the inner and outer races at a suitable angle to turn the rollers and the unsupported bearing race at high speed. The fluid strikes the rollers at about the center and splashes both inwardly and outwardly. The free turning movement of the bearing rollers and race together with the action of the strong directed jets of cleaning fluid produces a very thorough cleaning of all parts and avoids the possibility of binding, such as might cause grit to be ground into the bearing rollers or races. The rotation of the bearing parts assists in producing a strong cleaning action in a radial direction to supplement the axial cleaning action caused directly by the force of the jets. The centrifugal force of the rotating parts, particularly when the outer race rotates, aids greatly in producing thorough cleaning effects. Moreover, when the outer race rotates the operator at all desired times has visual assurance that the cleaning operation is proceeding properly. The result is a very thorough cleaning action.

If desired, the fluid openings of the heads 15' may be slotted, as shown at 30' in Fig. 7, instead of round, as shown in Fig. 6.

In Figs. 8 to 10 an adjustable head 15" is shown wherein the holes 30" in the main plate are arranged in three concentric rows for different sizes of bearings and wherein an adjustment plate 35 is provided with three corresponding concentric rows of inclined holes 36. The holes are so arranged that when one concentric row registers the other two rows are out of register and this may be accomplished by arranging the holes of one plate on common radial lines (Fig. 9) and arranging the holes of the other plate on angularly displaced radial lines (Fig. 10), so that when the plate 35 is turned through an angle, as by a hand piece 37, the holes of a selected circumferential row are made to match while the others are closed. The auxiliary plate may be retained by a screw 38.

In Figs. 11 and 12 there is shown a form of device adapted to clean a special type of bearing which has a V-shaped outer race 40 and a top plate 41 for retaining the ball rollers 42. In this case the cleaning head or supply tube is provided with an extension 43 adapted to be inserted through the opening in the plate 41 to position the lateral inclined holes 43a in line with the rollers 42. The bottom of the extension is closed and fluid is forced out the inclined holes 43a against the rollers to turn them within the race 40 which is held by the support. In this case the bearing assembly does not have an inner race, the rollers being prevented from falling out by their close assembly or otherwise.

In operation, the hinged closure 45 of the enclosing vessel 10 is opened, and bearing assemblies are placed on the lowered supports 20, 20a, after which the supports are raised by the eccentrics 26 to bring the bearing assemblies into proper relationship with respect to the heads 15. Whereupon fluid under pressure from the pump is forced through the inclined holes in the cleaning heads to strike the center of the rollers of the bearing assemblies and turn them. Due to high centrifugal force all foreign matter will be thrown out. The fluid can pass out of the bearings freely to the sump. When the inner race is supported by the inner member 20 the fluid can readily flow down around it; when the outer race is supported by the cupped member 20a the center of the member is provided with holes or spaced webs so the fluid can flow down through the openings; and when a bearing assembly like that shown in Figs. 11 and 12 is being cleaned, the fluid flows out and back and escapes at the center below the cleaning head.

While selected embodiments of the invention have been illustrated and described to furnish an understanding of the principles of the invention, it is to be understood that the invention may have various embodiments within the limits of the prior art and the scope of the subjoined claims.

I claim:

1. Apparatus for cleaning roller bearing assemblies comprising in combination, a member for supporting a bearing assembly by a race thereof, a cleaning fluid supply member disposed adjacent the supported bearing assembly and provided with nozzles for directing streams of cleaning fluid against the rollers of the bearing assembly at an angle such as to urge relative rotation between parts in the assembly while simultaneously effecting the cleaning operation, said fluid supply member having a part engaging the same race as that engaged by the supporting member, means for providing separation between said supporting member and said fluid supply member, and resilient means associated with said supporting member for urging the bearing race against the fluid supply member.

2. Apparatus for cleaning ball bearing assemblies comprising in combination, means for supporting a bearing assembly by one race only, means for directing a circumferential ring of forwardly directed jets at the center of the bearing balls, and only at the center, to produce rotation of the balls while simultaneously effecting the cleaning operation, and adjustment means for changing the location of said ring of jets to dispose the jets centrally of the balls of different sizes of bearing assemblies.

3. Apparatus for cleaning roller bearing assemblies comprising in combination, means for supporting bearing assemblies of different size, a cleaning head provided with a plurality of circumferential rows of inclined spray holes, and an auxiliary member adjustable relative to said head and provided with a plurality of circumferential rows of inclined spray holes so placed as to fit with the holes of the head, one row only at a time, and to fit all rows in the various adjusted positions.

4. Apparatus as set forth in claim 3, further characterized by the fact that said auxiliary member is secured exteriorly beneath said head to be readily adjustable from the outside.

5. Apparatus for cleaning roller bearing assemblies comprising in combination, a lower head including a vertical stud pin, and a support for a bearing race resiliently mounted thereon for vertical movement relative thereto, said stud pin being vertically movable and having a considerable range of movement for securing and releasing a bearing, an upper head including a part for engaging the same bearing race as the lower support, leaving the other bearing race and the bearing rollers free for rotation, and means for supplying cleaning fluid at a tangential forward inclination to the center of said rollers to clean and rotate them and the free bearing race.

6. Apparatus as set forth in claim 5, further characterized by the fact that said lower bearing support comprises a head having a guide element adapted to enter the interior space of the inner bearing race and a shoulder adapted to seat the lower inner edge of the inner race.

FRED L. STREUBER.